Feb. 18, 1947.  G. E. KING  2,416,181
CONTROL SYSTEM FOR ELECTRIC DRIVES
Filed Jan. 10, 1945
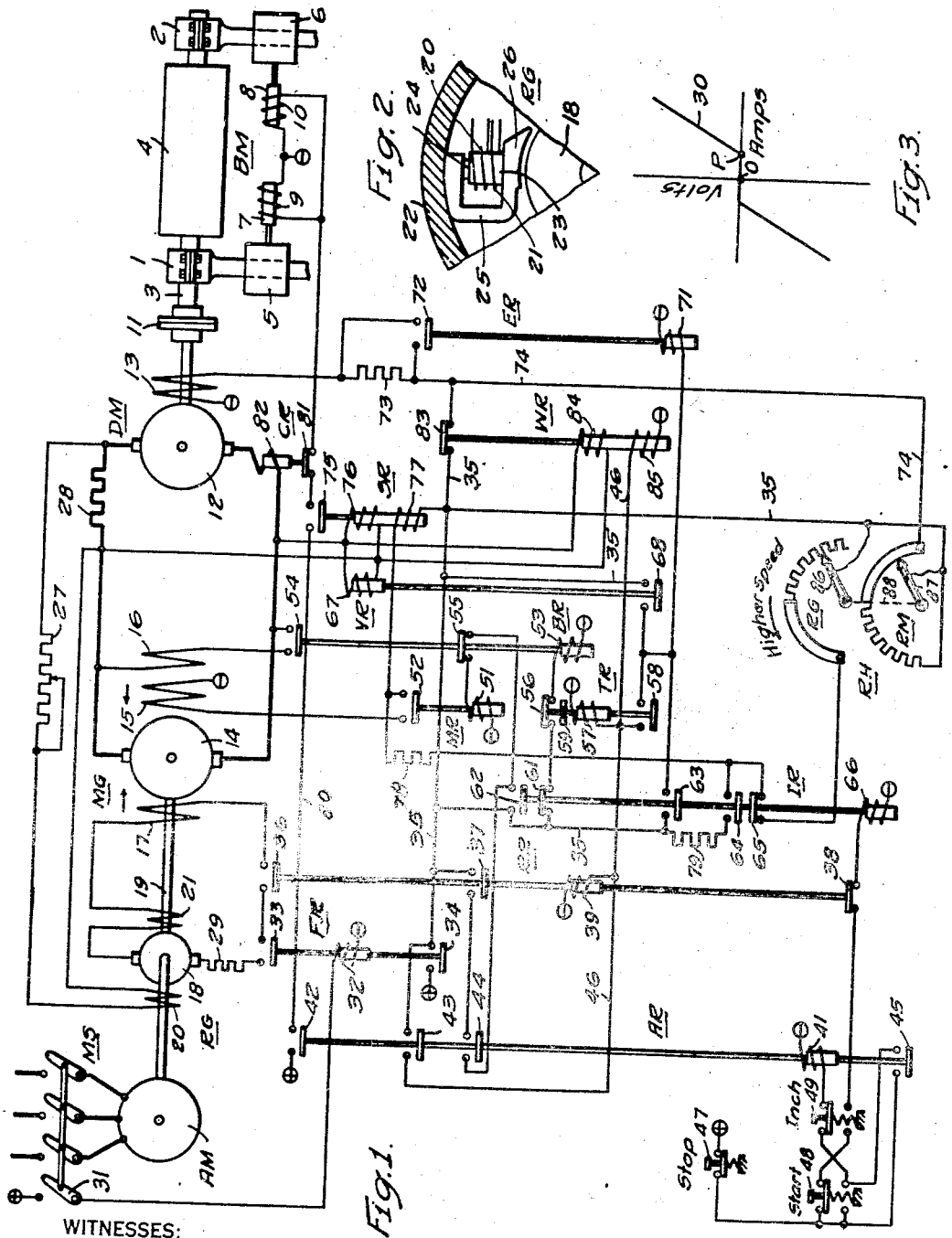
WITNESSES:
INVENTOR
George E. King.
BY
Paul E. Friedemann
ATTORNEY Patented Feb. 18, 1947

2,416,181

UNITED STATES PATENT OFFICE 2,416,181

CONTROL SYSTEM FOR ELECTRIC DRIVES

George E. King, Swissvale, Pa., assignor to Westinghouse Electric Corporation, East Pittsburgh, Pa., a corporation of Pennsylvania Application January 10, 1945, Serial No. 572,166

15 Claims. (Cl. 73—66)

1

My invention relates to control systems for electric drives, and especially to systems for controlling the driving equipment of machines for the dynamic balancing of rotatable bodies.

It is among the general objects of my invention to provide a motor control system which is capable of preventing the motor from being overloaded by reducing the speed of the motor automatically in response to the occurrence of overloads.

Another object of my invention, more specific than the one mentioned, is to devise a control system which permits accelerating and braking an electric drive motor at a high rate of change without fear of overloading the equipment. This object will be understood by a reference to machines for balancing heavy rotors. A machine of this type is operated by bringing the rotor to be tested and balanced up to normal speed, for instance, between 600 and 1800 rotations per minute. After the normal speed is reached, the vibrations of the rotor caused by its unbalance are measured as to their amount and angular position. Then the drive is stopped and the unbalance compensated by adding or subtracting material in predetermined planes of revolution of the rotor, the angular location and the amount of the correction being chosen in accordance with the measuring results. It is usually necessary to again accelerate the rotor up to normal speed and to repeat the test for balance and, if necessary, the balancing manipulations. It will be recognized that in this type of operation the accelerating and decelerating periods of the drive are unessential as regards the tests and balancing manipulations proper. Hence, it is desirable to maintain these periods as short as possible. On the other hand, however, an excessive rate of acceleration or deceleration of the motor might cause undue increases in the mechanical stresses and also in the current load imposed on the motor. Hence, it is the aim of my invention, in accordance with the last mentioned object, to afford an optimum rate of acceleration and deceleration without exceeding the limit determined by the occurrence of excessive loads, thereby minimizing the periods of time required for the starting and stopping of the machine.

Another object of my invention is to provide a dynamic balancing machine with control means which arrest and release the vibratorily mounted bearings for the rotor to be balanced in response to speed or load conditions of the electric drive of the machine so that the vibratory bearings are released only when the rotor revolves at a

2 sufficiently high speed or when the load conditions in the motor circuit do not involve detrimental overloads. In other words, this aspect of the invention aims at securing automatically a fixation of the bearings under operating conditions where the vibration pickups and measuring devices of the machine cannot perform useful operation.

A still further object of my invention relating also to the electrical driving equipment of the balancing machines is to provide the control system of such machines with operator-controlled means for "inching" the rotor to be balanced at high accuracy and without tendency of the drive motor to creep, i. e. of moving the rotor at slow speed any desired amount in order to permit placing it accurately in a desired position.

These and other objects of the invention will be understood from the following description of the embodiment illustrated in the drawing. Figure 1 shows diagrammatically those parts of a balancing machine that are essential in conjunction with the present invention, and also a variable voltage drive system for operating the balancing machine. Fig. 2 is a partial and partsectional view of a regulating generator which forms part of the system according to Fig. 1. Fig. 3 is an explanatory diagram representing schematically a typical input-output characteristic of a regulating generator according to Fig. 2.

Referring to Fig. 1, the balancing machine as a whole is denoted by BM and the appertaining drive motor by DM. The drive motor is energized from a main generator MG whose armature voltage is regulated by means of a regulating generator RG. Generators MG and RG are driven by an auxiliary motor AM which operates at constant speed and is energized from an alternating-current line through a main switch MS. The field excitation of drive motor DM and generator MG is controlled by a rheostat set denoted by RH which includes an individual rheostat RG for the main generator and a second rheostat RM for the motor DM. The circuits of the electric machines DM, MG and RG, as well as the circuit for controlling the clamping devices of the balancing machine to be described hereinafter, include a number of control relays designated in Fig. 1 as follows. A relay AR serves to place the control system selectively in operative or inoperative condition. A field relay FR controls the field connection of the electric machines MG and DM. Another relay RR has mainly the purpose of preparing or interlocking the coil circuits of several relays mentioned hereinafter. An inching relay IR controls the drive motor DM for performing inching motions at low speed as will be explained in a later place. A relay MR controls the main field circuit of generator MG while another field circuit of the same generator is under control by a braking relay BR. The operation of relay BR depends on the timing effect of a time relay TR. The system contains further a voltage relay VR, a speed relay SR for controlling the clamping devices of the balancing machine in dependence upon the speed conditions of motor DM, and a relay CR for controlling the same clamping devices in response to the load conditions of motor DM. A field weakening relay WR and a field strengthening relay ER are arranged to control the field circuit of drive motor DM in response to predetermined operating conditions of the balancing machine. Details of the just-mentioned equipment will be described presently.

The balancing machine BM has two bearings 1 and 2 for accommodating the shaft 3 of the rotatable body 4 to be balanced. The structure appertaining to the two bearings 1 and 2 is vibratorily mounted so that the bearings permit the rotor 4 to perform oscillations due to unbalance when the shaft 3 is driven at proper speed. These oscillations are determined by pickup devices and measuring apparatus (not shown in the drawing), and the rotor, upon stopping the machine, is then provided with balance weights or otherwise worked upon to remove the unbalance which caused the oscillation. Each bearing structure is provided with a clamping device 5 and 6, respectively, which is normally set for arresting the bearings 1 and 2. Each clamping device has an electromagnet 7 or 8 for releasing the bearing structures when the appertaining releasing coil 9 or 10 is energized.

The shaft 3 of the rotor to be balanced is connected by means of a coupling 11 to the armature 12 of drive motor DM. This motor has a separately excited field winding 13. Armature 12 is electrically connected to the armature 14 of generator MG. The variable direct-current voltage generated by generator MG is under control by three field windings 15, 16 and 17. Winding 15 is separately excited and represents the main field winding of generator MG. Winding 16 is a self-excited shunt winding and is rated for counteracting the residual magnetism of the generator. Consequently, winding 16, hereinafter called the "suicide field winding" tends to maintain the output voltage of armature 14 at zero when the other field windings of the main generator are deenergized. Hence the suicide field winding 16 prevents creeping of the drive motor DM under operating conditions where this motor is supposed to be stopped. Field winding 17 of generator MG is energized under control by the regulating generator RG whose armature 18 is mounted on a common shaft 19 with the main generator armature 14 and driven by the constant speed motor AM.

The regulating generator RG has a separately excited field winding 20 and a self-excited field winding 21. Both windings are arranged on field pole structures which involve a saturation feature whose principle will be understood from the following reference to Figs. 2 and 3.

The magnetizable stator 22 of generator RG carries field pole structures which have their main magnetic flux path 23 interrupted by an air gap or magnetically reluctant shim as indicated at 24. A saturable shunt path 25 is magnetically connected across main path 23 and shim 24. Main path and shunt path form a common pole shoe at 26. The separately excited field winding 20 and the self-excited field winding 21 are both located on the main portion 23 of the pole structure. As apparent from Fig. 1, the main regulator field winding 20 is connected through an adjusting rheostat 27 across the terminals of a resistor 28 which is series-connected in the armature circuit of main generator MG and drive motor DM. The voltage drop across resistor 28 is a measure of the load current flowing in the armature circuit. Consequently, the main winding of the regulating generator receives an excitation which corresponds to the load of the drive motor DM. The self-excited winding 21 is so connected and rated that its resistance line corresponds substantially to the no-load saturation characteristic of the regulating generator. In other words, the excitation winding 21 is just sufficient to sustain any output voltage of regulator RG which is determined by the excitation of winding 20. In this manner, winding 21 acts mainly to produce an amplifying effect without being capable of raising or lowering the regulator output voltage. Consequently, the voltage generated by generator RG is virtually exclusively determined by the control effect of winding 20. Reverting to Fig. 2, it will be recognized that this control effect is governed by the shunt effect of flux path 25. That is, when the excitation of main field winding 20 is low, the magnetic flux is short-circuited by the shunt path 25 so that virtually no flux enters from pole shoe 26 into the armature 18. As a result, no voltage is generated in armature 18 at a low excitation of field winding 20. When this field excitation increases to such an extent that the shunt path 25 becomes saturated, a portion of the magnetic flux is forced to pass from pole shoe 26 to armature 18 so that now a voltage is generated. The characteristic of generator RG thus obtained is typified by the diagram of Fig. 3. When the load current, measured in amperes, which flows through the drive motor DM remains below a magnitude denoted by point P in Fig. 3, the output voltage of generator RG remains zero. When the motor load current exceeds the value denoted by P, the regulator output voltage increases steeply in accordance with curve 30 shown in Fig. 3. At a very high excitation of winding 20, almost all of the flux induced in the pole structures of generator RG is forced through the armature 18.

The foregoing shows that the field winding 17 of main generator MG receives no excitation from the regulating generator RG unless the load of drive motor DM exceeds a given magnitude. Regulating field winding 17 is connected relative to the main field winding 15 of generator MG so that when the regulating generator generates voltage due to an excessive load in the motor armature circuit, the field excitation of winding 17 acts differentially with respect to main field winding 15 under driving conditions of motor DM. Therefore, the load responsive excitation of winding 17 reduces the resultant field excitation of the main generator and thereby reduces the voltage generated by armature 14. This, in turn, causes the armature 12 of motor DM to reduce its acceleration thereby diminishing the load current in the armature circuit. In this manner, a load limiting effect is imposed on the main generator by the control action of the regulating generator RG.

When drive motor DM is to be stopped, the main field winding of generator MG is de-energized in a manner still to be described, and the suicide winding 16 is connected across the generator armature 14 in order to reduce the main generator output voltage to the zero value. During the ensuing period of deceleration, the drive motor DM is braked by regenerative action. That is, the motor DM acts now as a generator and passes a voltage into its armature circuit, the direction of the regenerative voltage being opposite to the voltage previously generated by the main generator. Consequently, the voltage drop across resistor 28 changes its polarity so that the excitation of field winding 29 in the regulating generator RG tends to produce a regulator output voltage in opposition to that obtaining during driving periods of motor DM. When the regenerative current remains below a given value, corresponding to the limit value P indicated in Fig. 3, the output voltage of generator RG is again zero. However, if the regenerative load current exceeds the limit value, the output voltage of generator RG increases rapidly and imposes on the regulating field winding 17 an excitation which is now in the same direction as the excitation of the main field winding 15 during the driving periods of motor DM. Consequently the excitation of field winding 17 now causes the armature 14 of the main generator to issue a voltage in the driving direction of motor DM and hence in opposition to the regenerative voltage generated by motor armature 12. The resultant effect is a reduction in regenerative load current, and hence in the rate of deceleration of driving motor DM. In this manner, the regulating generator RG controls also the braking operation during regenerative periods of motor DM. Hence, it will be understood that both the driving operation and the braking operation of motor DM may be performed at optimum rates without incurring the danger of increasing the motor load beyond a safe value.

The main switch MS for energizing the auxiliary motor AM has an additional contact 31 which closes an energizing circuit for coil 32 of regulating field relay FR as soon as switch MS is closed. Relay FR has two contacts 33 and 34. Contact 33, when closed, prepares the armature circuit of generator RG for operation and contact 34, upon closure, closes the circuit of a group of energizing leads, all denoted by 35.

Relay RR has a contact 36 for completing the armature circuit of generator RG and is equipped with two other contacts 37 and 38 under control by the relay coil 39.

The start and stop relay AR has a control coil 41 for actuating four contacts denoted by 42, 43, 44 and 45, respectively. Coil 41 and contact 45 are connected to an energizing circuit which includes a stop contact 47, a start contact 48 and an inching contact 49. These contacts are preferably designed as push-button switches, and are so biased as to maintain the illustrated contact positions unless actuated by the operator. When stop button 48 is depressed, it closes the energizing circuit of coil 41 so that relay AR picks up. Contact 45 then closes a self-holding circuit for coil 41 so that the relay AR remains energized after the release of start button 48; and it returns into the illustrated inactive condition only when the operator depresses the stop button 47. The inching button 49 serves to initiate a slow inching operation of the drive motor DM in cooperation with the above-mentioned relay IR. As long as the inching button remains depressed, the circuit of coil 41 in relay AR is interrupted so that the drive cannot be inadvertently started by depressing the start button 48.

Relay MR has a coil 51 which, when energized, closes a contact 52 for closing the circuit of main field winding 15 in generator MG. The brake relay BR has its coil 53 acting upon a contact 54 for closing the shunt circuit of the suicide field winding 16 during decelerating or braking periods of motor DM. An interlock contact 55 also provided in relay BR is series arranged in the coil circuit of the main field relay MR, and hence prevents the main field winding 15 from being energized as long as suicide winding 16 is in operation. The excitation of coil 53 in brake relay BR is under control by the contact 56 of timing relay TR whose coil 57 controls also an interlock contact 58. The time relay may have a short-circuiting winding 59 in order to obtain a desired timing period.

The coil circuit of relay BR extends also through a normally closed contact 61 of the inching relay IR. This relay has four additional contacts 62, 63, 64 and 65, respectively, controlled by the appertaining relay coil 66. The circuit of this coil extends through the above-mentioned contact 38 of regulator relay RR, and is closed when and as long as the inching button 49 is depressed, provided relay RR is de-energized.

The voltage relay VR has its coil 67 connected across the armature 14 of main generator MG. The contact 68 of relay BR controls the excitation of coil 71 of field strengthening relay ER whose contact 72, when closed, short-circuits a resistor 73 in the field circuit 74 of the motor shunt field winding 13.

Speed responsive relay SR has a contact 75 controlled by two cumulatively acting coils 76 and 77. Coil 76 is connected across the armature 14 of generator MG and hence is excited in accordance with the voltage or approximate speed of motor DM. Coil 77 is connected in series with a calibrating resistor 78, which, in turn, is series-connected with a resistor 79 under control by the above-mentioned contact 64 of inching relay IR. A point between resistor 78 and 79 is connected, through contact 65 of relay IR, with one terminal of the speed adjusting rheostat RG. When inching relay IR is inoperative as shown in Fig. 1, coil 77 of relay SR in series connection with resistor 78 lies across the rheostat RG, and hence is energized by a voltage which corresponds to the voltage drop along the effective portion of rheostat RG. When this rheostat is set for a low speed of motor DM, i. e., has a high effective resistance, the just mentioned voltage drop is also high, thereby imposing a high excitation on coil 77 of relay SR. When the setting of rheostat RG is changed toward lower speeds, the voltage drop across the rheostat decreases so that the excitation of coil 77 decreases accordingly. At a setting of rheostat RG for high motor speeds, the voltage impressed across relay coil 77 is zero. It follows from the just mentioned connections that the operating condition under which the relay SR will close its contact 75 depends on two components, namely, on the speed setting of rheostat RG and on the actual instantaneous voltage or speed of drive motor DM. Relay SR is adjusted to pick up near the maximum generator voltage as set by the rheostat RG. If this rheostat is set for a low speed, the excitation of coil 77 is strong, so that a relatively low excitation of coil 76 is required to achieve the necessary resultant value of pickup excitation, hence contact 75 will close when the voltage generated by armature 14, during accelerating periods, approaches closely the value set by rheostat RG. At a higher speed setting of relay RG, coil 77 is weakly excited so that a correspondingly higher excitation of coil 76 is necessary to achieve the resultant pickup value. That is, contact 75 is again closed when the voltage generated by armature 14 approaches closely the higher value now determined by the setting of rheostat RG. Contact 75 is series connected with the above mentioned contact 42 of relay AR in the energizing circuit 80 of the clamp controlling coils 9 and 10 of the balancing machine BM. As mentioned above, contact 42 of relay AR is closed whenever the drive motor is started by depressing the start button 48. However, the coil circuit 80 remains at first interrupted until the driving speed of motor DM is close to that selected by the setting of the rheostat set RH. Then the closure of contact 75 imposes excitation on the releasing coils 9 and 10 so that now the previously arrested bearing structures of the balancing machine become free to vibrate under the influence of any unbalance of rotor 4. The just mentioned circuit of coils 9 and 10 extends also through the contact 81 of relay CR. The coil 82 of this relay is series-connected in the armature circuit of the drive motor DM. When the drive motor is accelerated from a condition of rest, the load current in its armature circuit is at first relatively high. As the motor speed approaches the speed determined by the setting of rheostat set RH, the load current decreases and drops eventually below the full load current of the motor since it requires, for instance, only 25% of the rated motor current to maintain the rotor at constant speed for the purposes of testing its balance. Under the effect of the initially high load, coil 82 is sufficiently energized to open the contact 81. Consequently, the clamping devices of the balancing machine remain at first set for operation. When the load current approaches the relatively low operating value, relay CR drops out and causes a release of the bearing clamps, provided the motor speed as determined by relay SR is sufficiently high.

Relay WR has its contact 83 controlled by two cumulatively acting coils 84 and 85. Coil 85 receives constant excitation as long as relay AR is in picked-up condition, while coil 84 is excited in proportion to the voltage generated by generator MG.

The two individual rheostats RG and RM of the rheostat assembly RH have their respective sliders 86 and 87 interconnected by a common shaft or transmission represented in Fig. 1 by the dash line denoted by 88. In this manner the rheostats RG and RM are so correlated that for increasing the motor speed the excitation of the main generator field winding 15 is at first progressively increased up to a maximum value determined by the calibration of the above-mentioned resistor 78, while the field excitation of the motor field winding 13 remains at a maximum value during the just mentioned range of adjustment and is decreased by rheostat RM only in order to obtain speeds above the maximum resistance setting of rheostat RG.

The operation of the control system as a whole is as follows.

In order to prepare the system for operation, main switch MS is closed. This causes motor AM to drive the armatures of generators RG and MG at the proper speed. At the same time contact 76 of switch MS energizes relay FR which, at 33, prepares the armature circuit of the regulating generator RG for operation. Contact 34 of relay FR closes and thereby completes an energizing circuit for the shunt field winding 13 of motor DM. This circuit extends from winding 13 through resistor 73, conductor 74, rheostat RM, conductor 35 and contact 34. The closure of contact 34 also prepares a circuit for the main field winding 15 of generator MG whose completion becomes now merely subject to the subsequent closure of contact 52 in relay MR. This main field circuit extends from field winding 15 and the now open contact 52 through resistor 78, contact 65, rheostat RG, conductor 35 and contact 34. A further effect of the closure of contact 34 is to energize coil 53 of relay BR in the circuit: 53, 56, 61, 35, 34. Relay BR picks up and closes at 54 the circuit of the suicide field winding 16 while preventing at contact 55 the excitation of winding 51. Hence the output voltage of generator armature 14 is zero and the suicide field winding prevents creeping of the motor armature 12. As a result, the system, though now in operative condition, maintains the drive motor DM stopped.

In order to start motor DM, the operator depresses the start button 48. This causes relay AR to pick up and to remain in picked up condition. Contact 43 of relay AR energizes coil 39 of relay RR, coil 57 of timing relay TR and coil 85 of field weakening relay WR. Relays RR and TR pick up while relay WR remains dropped off until its second coil 84 is energized by nearly maximum generator voltage. The timing relay TR opens the energizing circuit of coil 53 so that the relay BR drops off. Now, contact 54 of relay BR interrupts the circuit of the suicide field winding while contact 55 of the same relay in series connection with contacts 54 and 37 of relays AR and RR, respectively, completes the circuit of coil 51 so that the appertaining contact 52 closes and completes the above-mentioned energizing circuit of main field winding 15. This circuit includes the rheostat RG so that the excitation of field winding 15 is in accordance with the setting of this rheostat. Generator MG now produces an increasing voltage and circulates a current through the armature circuit which causes the motor DM to accelerate. Relay CR picks up, for instance, at about 50% of the full load, and relay VR picks up at a low value of generator voltage. When the armature current exceeds a given value as measured by field winding 20 of the regulating generator RG, the generator RG passes a current through its self-energizing winding 21 and the regulating field winding 17 of generator MG. The field produced by winding 17 opposes that of the main field winding 15 and thus prevents the load current of motor DM from exceeding a predetermined value. During the accelerating period of motor DM, the excitation of its shunt field winding 13 is at its maximum value in order to secure a high rate of acceleration. However, when the generator voltage approaches its desired maximum value, the field weakening relay WR picks up and inserts the motor rheostat RM in series with the shunt field winding 13. Consequently, the field excitation of motor DM is now reduced in order to obtain a still further acceleration, limited only by the above-mentioned regulating effect of generator RG. As explained previously, the energizing circuit 80 of the clamp releasing coils 9 and 10 is at first open at contacts 75 and 81 so that the clamps remain set and arrest the vibratory bearing structures of the balancing machine. When the voltage generated by armature 14 approaches the intended value, relay SR picks up as set forth in the foregoing; and when the load current drops to its normal value, the relay CR drops off, thereby closing its contact 81. Hence, the circuit 80 is now completed and the bearing structures of the machine are released, thereby placing the machine into condition for performing the balance tests.

In order to stop the machine, the operator actuates the stop button 47. This interrupts the self-holding circuit of coil 41 so that relay AR drops off. Contact 42 of relay AR opens immediately and thereby de-energizes the clamp releasing coils 9 and 10. As a result, the bearing structures of the balancing machine are arrested during the entire decelerating or braking period. The opening of contact 44 in relay AR interrupts the coil circuit of relay MR, so that the main generator field winding becomes de-energized. Relays RR, TR and WR are held in because contacts 58 and 68 of relays TR and VR, respectively, remain closed. As now the main generator field collapses, the generator voltage decreases below the countervoltage of motor DM, causing the motor to regenerate. The current in the armature circuit of generator MG and motor DM reverses and, when this current exceeds a given value, the generator RG circulates a current through the field winding 17 of generator MG in the reverse direction from that during driving periods of motor DM. This tends to hold up the generator voltage and thus limits the braking current in the armature circuit of motor DM. When the generator voltage reaches a low value, relay VR drops out and, by opening of its contact 68, de-energizes the coils of relays RR, TR and WR. Relay WR drops out as the generator voltage declines. Upon elapse of its timing periods, relay TR drops out and energizes at contact 56 the brake relay BR which then connects at contact 54 the suicide field winding 16 across the generator armature thereby bringing the motor to rest.

In order to perform inching operations i. e. for moving the rotor 4 at low speed into any desired angular position, the inching button 49 is to be depressed. This energizes coil 66 of relay IR provided relay RR is in dropped off condition so that the armature circuit of the regulating generator is interrupted. If it is desired to maintain the regulating generator RG in the operative condition during inching operations, a jumper may be connected across contact 36. The energization of relay IR has the effect of disconnecting the rheostat RG at contact 65 from the main field winding 15 of generator MG and instead connecting this winding, at contact 64, to the resistor 79 which has a resistance value properly selected for the desired inching speed. At the same time, contact 63 of relay IR energizes coil 71 of relay ER so that contact 72 is closed thereby shunting the resistor 73 out of the motor field circuit. As a result, the field excitation of the motor is also recalibrated for the desired low inching speed. Contact 61 of inching relay IR opens the coil circuit of brake relay BR so that the suicide field winding is disconnected at contact 54. The inching operation continues as long as the control button 49 remains depressed. The release of the control button has the effect of placing relay IR and the just mentioned associated circuits into the original position, thereby stopping the motor DM. The brake relay BR is re-energized due to the closure of contact 61, and, while de-energizing, the coil 51 of relay MR reestablishes the connection of the suicide field winding 16. Consequently, the generator suicide field becomes effective immediately after releasing the inching button. It is thus possible by actuating the inching button 49 to move the rotor 4 slowly and accurately into any desired position, for instance, in order to attach to the rotor the additional weights required for establishing the desired balance condition.

It will be understood by those skilled in the art on the basis of the foregoing disclosure that the control systems according to my invention can be modified in various respects and as regards various details within the scope of my invention and without departing from the essential features of the invention as set forth in the claims annexed hereto.

I claim as my invention:

1. A control system for an electric drive, comprising a direct-current drive motor; a main generator having a load circuit connected to said motor for energizing said motor by variable voltage and having a main field winding and a regulating field winding disposed for controlling said voltage in opposition to each other during driving periods of said motor; energizing circuit means connected to said main field winding and having circuit control means which include an adjustable circuit member for adjusting said voltage in accordance with desired speed conditions of said motor; a regulating generator having an armature circuit connected to said regulating field winding and a separately excited field winding for controlling the voltage of said armature circuit; current-responsive means connected to said separately excited field winding for exciting it in dependence upon and in accordance with the direction of the current flowing in said load circuit; said circuit control means being arranged to render said main field winding inoperative for decelerating and stopping said motor so that said regulating field winding is effective in regenerative periods of said motor to provide load-controlled dynamic braking for said motor.

2. A control system for an electric drive, comprising a direct-current drive motor; a main generator having a load circuit connected to said motor for energizing said motor by variable voltage and having a main field winding and a regulating field winding disposed for controlling said voltage in opposition to each other during driving periods of said motor; energizing circuit means connected to said main field winding and having circuit control means which include an adjustable circuit member for adjusting said voltage in accordance with desired speed conditions of said motor; a regulating generator having an armature circuit connected to said regulating field winding, a separately excited field winding, and a magnetic field pole structure provided with a main magnetic flux path and a saturable flux path in magnetic shunt connection with said main path; current-responsive means for exciting said separately excited field winding in dependence upon and in accordance with the direction of the current flowing in said load circuit; said circuit control means being arranged to render said main field winding inoperative for decelerating and stopping said motor whereby said regulating field winding is effective to reduce said voltage during said driving periods and to provide controlled braking during regenerative periods of said motor when said current exceeds a given value determined by the saturation characteristic of said structure.

3. A control system for an electric drive, comprising a direct-current drive motor; a main generator having a load circuit connected to said motor for energizing said motor by variable voltage and having a main field winding and a regulating field winding disposed for controlling said voltage in opposition to each other during driving periods of said motor; energizing circuit means connected to said main field winding and having circuit control means which include an adjustable circuit member for adjusting said voltage in accordance with desired speed conditions of said motor; a regulating generator having an armature circuit connected to said regulating field winding, a self-excited field winding connected with said armature circuit, a separately excited field winding, and a magnetic field pole structure provided with a main magnetic flux path and a saturable flux path in magnetic shunt connection with said main path; current-responsive means for exciting said separately excited field winding in dependence upon and in accordance with the direction of the current flowing in said load circuit; said circuit control means being arranged to render said main field winding inoperative for decelerating and stopping said motor whereby said regulating field winding is effective to reduce said voltage during said driving periods and to provide controlled braking during regenerative periods of said motor when said current exceeds a given value determined by the saturation characteristic of said structure and the degree of excitation of said self-excited field winding.

4. A control system for an electric drive, comprising a direct-current drive motor; a main generator having a load circuit connected to said motor for energizing said motor by variable voltage and having a main field winding and a regulating field winding disposed for controlling said voltage in opposition to each other during driving periods of said motor; energizing circuit means connected to said main field winding and having circuit control means which include an adjustable circuit member for adjusting said voltage in accordance with desired speed conditions of said motor; a regulating generator having an armature circuit connected to said regulating field winding, a self-excited field winding connected with said armature circuit, a separately excited field winding connected to said load circuit so as to be energized in dependence upon the magnitude and in accordance with the direction of the current flowing in said load circuit, and a magnetic field pole structure provided with a main magnetic flux path and a saturable flux path in magnetic shunt connection with said main path; said circuit control means being arranged to render said main field winding inoperative for decelerating and stopping said motor; whereby said regulating field winding is effective to reduce said voltage during said driving periods and to provide controlled braking during regenerative periods of said motor when said current exceeds a given value determined by the saturation characteristic of said structure and the degree of excitation of said self-excited field winding.

5. For a balancing machine having vibratorily mounted bearing means for a rotatable body to be balanced and clamping means for arresting said bearing means, a control system comprising in combination an electric motor for driving the rotatable body, controllable energizing means for operating said motor, and means for controlling the clamping means in dependence upon an operating condition of said motor so as to release the bearing means when said motor condition has a proper value.

6. For a balancing machine having vibratorily mounted bearing means for a rotatable body to be balanced and clamping means for arresting said bearing means, a control system comprising in combination an electric motor for driving the rotatable body, controllable energizing means for operating said motor, and current-responsive control means connected to the clamping means for causing them to arrest the bearing means when the load current of said motor exceeds a given value.

7. For a balancing machine having vibratorily mounted bearing means for a rotatable body to be balanced and clamping means for arresting said bearing means, a control system comprising in combination an electric motor for driving the rotatable body, controllable energizing means for operating said motor by variable voltage, and voltage-responsive control means connected to the clamping means for causing them to release the bearing means when the voltage applied by said energizing means to said motor exceeds a given value.

8. For a balancing machine having vibratorily mounted bearing means for a rotatable body to be balanced and clamping means for arresting said bearing means, a control system comprising in combination an electric motor for driving the rotatable body, controllable energizing means for operating said motor by direct current and having adjusting means for selecting a desired operating voltage of said current, and control means connected to the clamping means for causing them to release the bearing means when the voltage applied by said energizing means to said motor exceeds a given value, said control means being connected with said adjusting means so that the magnitude of said given value depends on the setting of said adjusting means so that the release occurs when the motor voltage during acceleration approaches said desired operating voltage.

9. For a balancing machine having vibratorily mounted bearing means for a rotatable body to be balanced and clamping means for arresting said bearing means, a control system comprising in combination a direct-current motor for driving the rotatable body, a generator having an armature circuit for supplying energizing current to said motor and a field winding for controlling the voltage of said current, circuit means disposed for exciting said field winding and including an adjustable rheostat for selecting a field excitation in accordance with a desired motor speed, means for controlling the clamping means, and relay means connected with said armature circuit and with said circuit means for releasing the clamping means when, after starting said motor, said voltage reaches a value determined by the selected setting of said rheostat.

10. For a balancing machine having vibratorily mounted bearing means for a rotatable body to be balanced and clamping means for arresting said bearing means, a control system comprising in combination a direct-current motor for driving the rotatable body, a generator having an armature circuit for supplying energizing current to said motor and a field winding for controlling the voltage of said current, circuit means disposed for exciting said field winding and including an adjustable rheostat for selecting a field excitation in accordance with a desired motor speed, means for controlling the clamping means, and an electromagnetic relay disposed for controlling the clamping means and having two control windings connected across said rheostat and across said armature circuit respectively for releasing the clamping means when said voltage is above a value determined by the selected setting of said rheostat and increasing with an increase in selected motor speed.

11. For a balancing machine having vibratorily mounted bearing means for a rotatable body to be balanced and clamping means for arresting said bearing means, a control system comprising in combination an electric motor for driving the rotatable body, controllable energizing means for operating said motor, and control means disposed for controlling the clamping means and having a voltage-responsive device for releasing the clamping means when the voltage impressed on said motor is above a value determined by the selected setting of said energizing means and a current responsive device for causing the clamping means to arrest the bearing means when the load current passing through said motor exceeds a given value.

12. For a balancing machine having vibratorily mounted bearing means for a rotatable body to be balanced and clamping means for arresting said bearing means, a control system comprising in combination an electric motor for driving the rotatable body, controllable energizing means for operating said motor, and control means disposed for controlling the clamping means and having a voltage-responsive device for releasing the clamping means when the voltage impressed on said motor is above a given value and a contactor for setting the clamping means when said energizing means are rendered inoperative so that the bearing means are arrested during the braking periods of said motor.

13. For a balancing machine having vibratorily mounted bearing means for a rotatable body to be balanced and clamping means for arresting said bearing means, a control system comprising in combination a direct-current motor for driving the rotatable body, a generator having an armature circuit for supplying energizing current to said motor and a field winding for controlling the voltage of said current, first circuit means disposed for exciting said field winding and including an adjustable rheostat for selecting a field excitation in accordance with a desired motor speed, means for controlling the clamping means and operator-controllable second circuit means connected with said first circuit means and said control means for causing said first circuit means to temporarily supply to said generator a field excitation for low speed operation of said motor independent of the adjustment of said rheostat while causing said control means to maintain the bearing means in arrested condition during the operation of said second circuit means.

14. For a balancing machine having vibratorily mounted bearing means for a rotatable body to be balanced and clamping means for arresting said bearing means, a control system comprising in combination a direct-current motor for driving the rotatable body, a generator having an armature circuit for supplying energizing current to said motor, said generator being provided with a main field winding for controlling the voltage of said current and having a self-excited suicide field winding for preventing creeping of said motor, first circuit means connected to said main field winding and including adjustable impedance means for controlling the excitation of said main field winding in accordance with a desired speed of said motor, and operator-actuable second circuit means connected with said main field winding for exciting it for low speed operation of said motor and including control means for causing said suicide field winding to become operative at the moment when the operator terminates actuating said second circuit means.

15. For a balancing machine having vibratorily mounted bearing means for a rotatable body to be balanced and clamping means for arresting said bearing means, a control system comprising in combination a drive motor for driving the rotatable body, adjustable circuit means for energizing said motor to run at controllable speed, control means for controlling the clamping means, and inching control means disposed for controlling said motor so as to run at a low speed independent of the speed adjustment of said circuit means and being interlocked with said control means so as to prevent the latter from releasing the clamping means during inching operations.

GEORGE E. KING.

REFERENCES CITED

The following references are of record in the file of this patent:

UNITED STATES PATENTS

| Number | Name | Date |
| --- | --- | --- |
| 2,043,618 | Havill | June 9, 1936 |
| 2,078,796 | Greentree et al. | Apr. 27, 1937 |
| 2,219,795 | Van Degrift | Oct. 29, 1940 |
| 2,315,578 | Baker | Apr. 6, 1943 |